Nov. 16, 1937.   F. W. WERRING   2,099,643
TEMPERATURE AND PRESSURE RELIEF VALVE
Filed March 23, 1934   2 Sheets—Sheet 1

WITNESS:

INVENTOR
Francis W. Werring
BY
Augustus B. Stoughton
ATTORNEY.

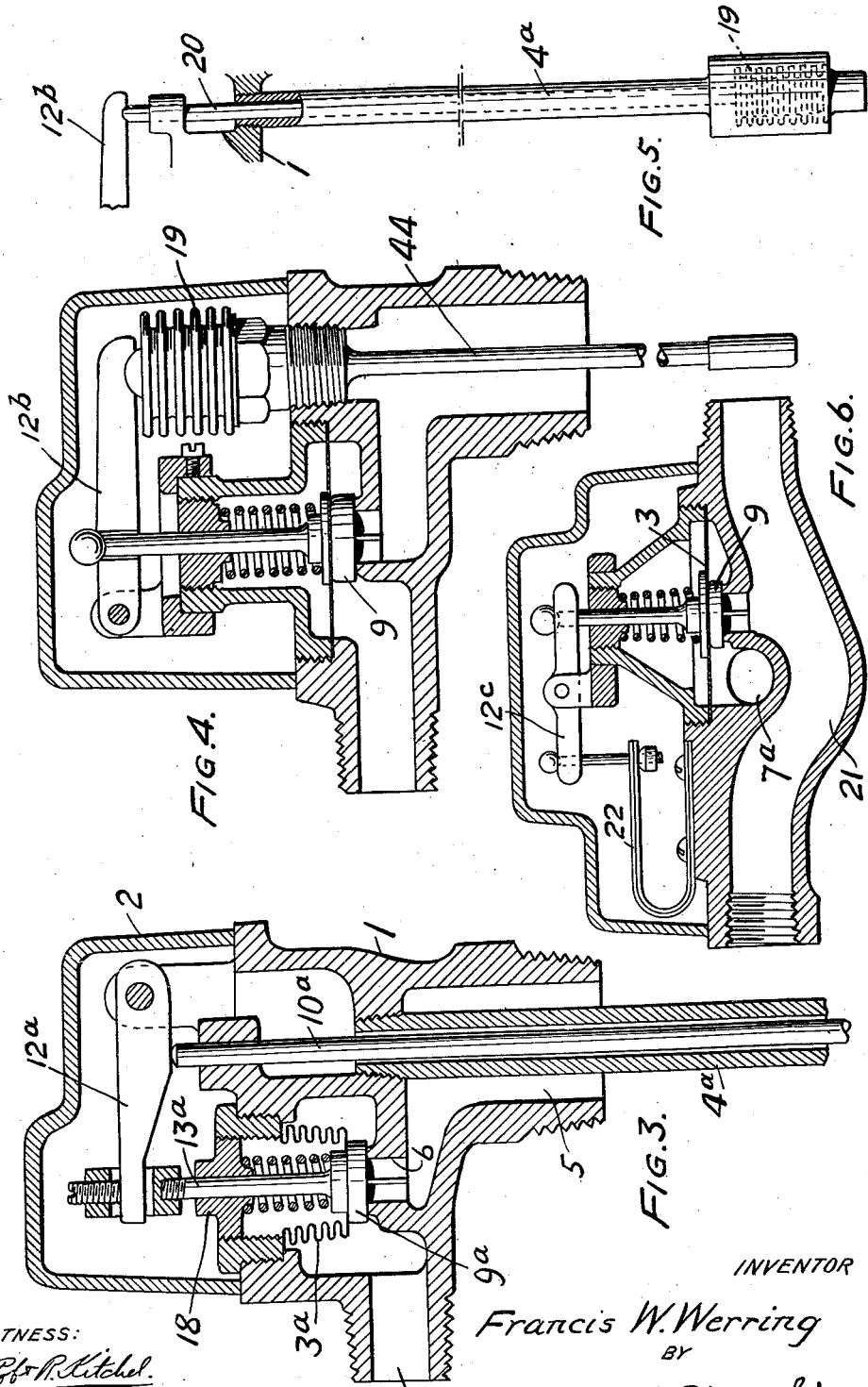

Patented Nov. 16, 1937

2,099,643

UNITED STATES PATENT OFFICE 2,099,643

TEMPERATURE AND PRESSURE RELIEF VALVE

Francis W. Werring, Philadelphia, Pa., assignor to Kitson Company, Philadelphia, Pa., a corporation of West Virginia Application March 23, 1934, Serial No. 717,023

5 Claims. (Cl. 137—139)

The present invention relates to automatic self-closing temperature or temperature and pressure relief valves of the thermostatic type.

It is the principal object of the present invention to arrange the working parts of the valve including the thermostatic device out of contact with water, or more accurately, out of contact with the water contained in the vessel or boiler with which the valve device is used as well as with water that is discharged at proper times through the valve device to the spillway; and another object is to provide a friction free valve guided by diaphragm packing.

Other objects of the invention will appear from the following description at the end of which the invention will be claimed.

Generally stated, the invention comprises a relief valve device in which the moving parts, including a thermostatic element for working the valve, are housed in a chamber from which water is excluded and in which use is made as a packing of a flexible diaphragm device interposed between the valve and the fluid or spillway which the valve controls for the purpose of excluding water from all the working parts which operate the valve. The invention also comprises the improvements to be presently described and finally claimed.

In the following description reference will be made to the accompanying drawings forming part hereof and in which, Figure 1 is a transverse sectional view of a valve device embodying features of the invention.

Figure 3 is a view similar to Figure 1 and illustrating a modification.

Figure 4 is a similar view illustrating another modification in which use is made of a different type of thermostatic device.

Figure 5 is a detached view illustrating a modification of the arrangement shown in Figure 4, and Figure 6 is a sectional view illustrating, as a modification, a different application of the invention.

Figure 1:
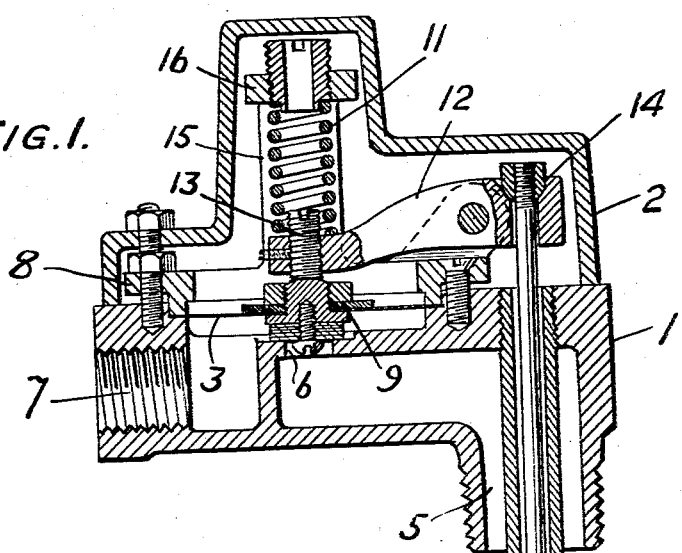

Referring more particularly to Figure 1, the parts 1, 2, 3, and 4 provide a chamber or housing from which all water is excluded so that the working parts of the valve device, including the thermostatic element, are entirely out of the water. Within the part 1 there is a fluid way 5, a valve opening 6, and a spillway or waste way 7. Between the chamber and the water passages is arranged the diaphragm device 3. At one of its rims it is sealed to the part 1 by the ring 8, and at the other of its rims it is sealed to the valve 9. The diaphragm 3, therefore, serves as a packing to exclude water from the working parts of the valve including the thermostatic rod 10, and the diaphragm also serves to guide the valve 9 so that the valve 9 in its movements is subjected to little or no friction. The working parts of the valve include a lever 12 pivotally supported intermediate of its length by a bracket 13b and having one end contacting with the thermostatic rod 10 through a ball joint connection 14. The abutment for the spring 11 consists of a frame 15 provided with an adjusting screw 16. The part 4 comprises a well closed at the bottom by a cap 17 to which the rod 10 is attached. In operation the tube or well 4, being for example of brass, expands with increased temperature and pulls the rod or wire 10 which is of lesser expanding metal as "Invar", and this pull is exerted along the center line of the rod 10. Downward movement of the rod 10, caused in the manner described, turns the lever 12 to clear the valve 9 which opens the waste way under water pressure. For this purpose the diaphragm springs a little but constitutes an efficient packing for excluding water from all of the working parts of the valve device.

Figure 2:
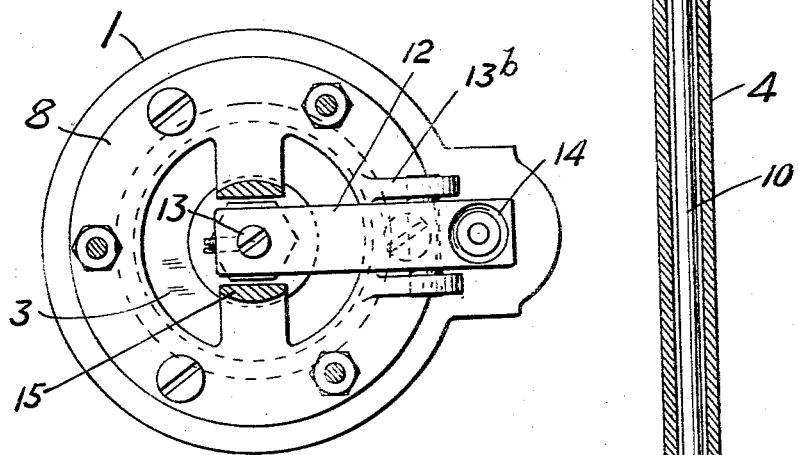
Figure 2 is a top or plan view of the same with parts removed.

The construction and mode of operation of the modification shown in Figure 3 are as above described except that the lever 12a is pivoted at one end and the rod element 10a is the elongating element and operates upon rise in temperature to turn the lever 12a clockwise and so to lift the valve 9a from its seat. In this case the valve is guided at 18 and also at the valve opening 6. In this figure as well as in Figures 1 and 2 not only is the valve opened or allowed to open by the thermostatic device, but it is free to open against its spring by increase in water pressure. Adjusting screws are provided in each of the constructions for adjusting the valve and its spring and pivotal lever.

In the modification shown in Figure 4 the construction and arrangement are substantially as described in connection with Figure 3 except that the lever 12b is pivoted at one end, the valve stem is connected at an intermediate point, and the free end of the lever is acted upon by a sylphon bellows 19 of which well 44 is a provision. Upon rise in temperature the sylphon bellows expands and opens the valve.

In the modification shown in Figure 5 the sylphon bellows is arranged in a well 4a and upon expansion and contraction operates on the lever 12ᵇ through a rod 20.

In the modification shown in Figure 6 the construction and operation are as have been described except that the device is arranged for operation in connection with a stream of water flowing through the passage 21 and the thermostatic device 22 is of U form and has one of its ends connected with one free end of the centrally pivoted lever 12ᶜ of which the other end is connected with the stem of the valve 9. The outlet of the spillway is shown at 7ᵃ.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. A pressure responsive and temperature responsive relief valve device, comprising in combination, a casing having therein an inlet and an outlet, a valve seat interposed between said inlet and said outlet, a valve co-operating with said valve seat, a spring stressing said valve to closed position, a lever connected in operative relation to said valve, a thermostatic element in heat transfer relation to said inlet so as to be responsive to the temperature of fluid in said inlet and abutting in operative relation on said lever to move said valve in response to temperature in opposition to said spring and to be operatively disconnected from said valve upon movement of said valve in response to pressure on said valve, and a flexible diaphragm connected to said valve and to parts of said casing so as to form a flexible wall of a chamber in said casing, said chamber being sealed by said diaphragm from fluid in said casing and containing said spring and said lever and at least a part of said thermostatic element.

2. A valve in accordance with claim 1, in which the thermostatic element comprises, an outer element of metal and connected to said casing and projecting into said inlet, and an inner element of another metal within said outer chamber and sealed from the fluid and abutting on said lever.

3. A valve in accordance with claim 1, in which the thermostatic element comprises, an outer element connected to said casing and projecting into said inlet, and a flexible bellows in said chamber and in heat transfer relation to fluid in said inlet and containing a volatile fluid and connected to said lever.

4. A valve in accordance with claim 1, in which the thermostatic element comprises a bimetallic element in said chamber.

5. A pressure responsive and temperature responsive relief valve device comprising, a casing having an inlet and an outlet, a valve seat interposed between said inlet and said outlet, a movable valve cooperating with said seat, a spring stressing said valve to closed position, a thermostatic element extending into said inlet and connected in operative relation to said valve to move said valve in response to predetermined temperature in said inlet and in opposition to said spring and disconnected from operative relation with said valve upon movement of said valve in response to pressure on said valve, and a flexible diaphragm connected to said valve and to parts of said casing so as to form a flexible wall in a chamber of said casing, said chamber being sealed from fluid in said casing and containing said spring and at least a portion of said thermostatic element.

FRANCIS W. WERRING.